March 17, 1953

H. B. SCHULTZ 2,631,795

HYDRAULICALLY CONTROLLED STEERING
MECHANISM FOR AIRCRAFT

Filed May 2, 1947

INVENTOR.
HAROLD B. SCHULTZ
BY
Cecil J Arens
ATTORNEY

Patented Mar. 17, 1953

2,631,795

UNITED STATES PATENT OFFICE 2,631,795

HYDRAULICALLY CONTROLLED STEERING MECHANISM FOR AIRCRAFT

Harold B. Schultz, South Bend, Ind., assignor to Bendix Aviation Corporation, South Bend, Ind., a corporation of Delaware Application May 2, 1947, Serial No. 745,676

3 Claims. (Cl. 244—50)

This invention relates generally to steering mechanisms and more particularly to a steering device for the nose wheel of an airplane.

The invention comprehends as one of its objects the provision of a steering apparatus for the nose wheel of an airplane wherein the wheel is remotely controlled through the hydraulic actuation of a valve.

An object of the invention resides in the provision of a power steering apparatus for the nose wheel of an aircraft in which the power for steering is obtained from an open hydraulic system and the control of this power is through the medium of a closed hydraulic system.

A further object of the invention is to provide a steering apparatus for actuating a member to be steered and including two independent hydraulic systems one of which supplies power for moving said member and the other which controls the power.

A still more important object of the invention embraces a hydraulic steering apparatus connected to a steered member in a manner to impart movement thereto whereupon the cause producing said movement diminishes with the movement of the steered member.

The above and other objects and features of the invention will be apparent from the following description of the apparatus taken in connection with the accompanying drawings which form a part of this specification, and in which:

Figure 1 exemplifies the complete steering apparatus;

Figure 1:
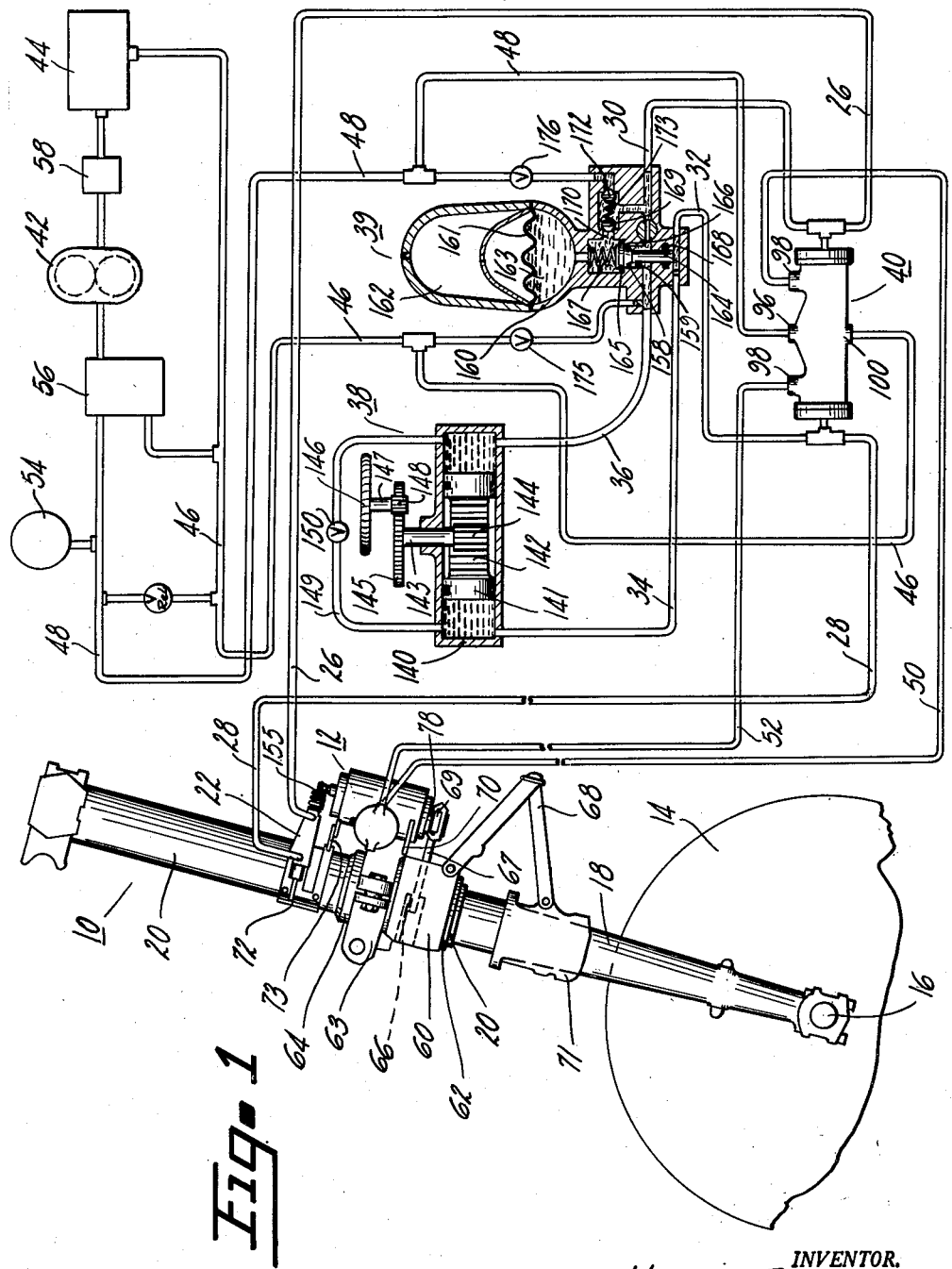

Referring to Figure 1 of the drawings reference numeral 10 designates a landing gear for an aircraft, not shown, having an actuator 12 mounted thereon and steerably connected to a steered member or wheel 14 pivotally positioned on an axle 16 integral with a tube 18 rotatable about its axis and telescoped into a larger tube 20 to which the actuator is fixedly secured.

The steering apparatus includes the actuator 12, operatively connected to a follow-up motor or receiver 22 which is interconnected through conduits 26, 28, 30, 32, 34 and 36 with a transmitter 38. A compensator 39 is interposed between conduits 32 and 34, and 30 and 36 to compensate the system for pressure changes due to temperature variation of the fluid. A hydraulically actuated valve 40 is interposed between conduits 26 and 30, and 28 and 32, for controlling fluid under pressure to the actuator from pump 42, and the return of fluid to reservoir 44. Conduits 46, 48, 50 and 52 interconnect the actuator to the pump and reservoir through the hydraulically actuated valve 40. The pump 42 puts fluid under pressure in an accumulator 54 which stores the fluid until a predetermined pressure is reached at which time an unloading valve 56 is operated to by-pass fluid to the reservoir 44. A filter 58 is interposed in the line between the reservoir and pump.

The wheel 14 is rotatably carried by the axle 16 which is integral with the tube 18 which telescopes into the larger tube 20. The inner tube 18 slides and rotates freely in the outer or larger tube 20 to permit pivoting about an axis normal to the wheel axle for steering. A collar 60 fits over one end of the outer tube 20 and bears at one end on a flange 62 integral therewith. At its other end the collar bears against a fitting 63 which is securely keyed to the tube and held against axial movement by a nut 64. The collar is free to rotate around the outer tube and is formed with a lever 66 to which is connected one end of a link 67, the other end of which is connected to a lever 69 of the actuator 12 for imparting rotation to the collar. A second collar 71 is fixedly secured to the inner tube 18. A scissors lever 68 connects the rotatable collar with the collar 71 to thereby enable the tubes to slide axially with respect to each other and to provide for rotation of the inner tube through rotation of the collar 60. The fitting 63 supports the actuator through a bracket 70. A clamp 72 is secured to the outer tube 20 and supports the receiver 22. The clamp 72 also provides a support for the actuator 12 through a bracket 73.

Figure 2:
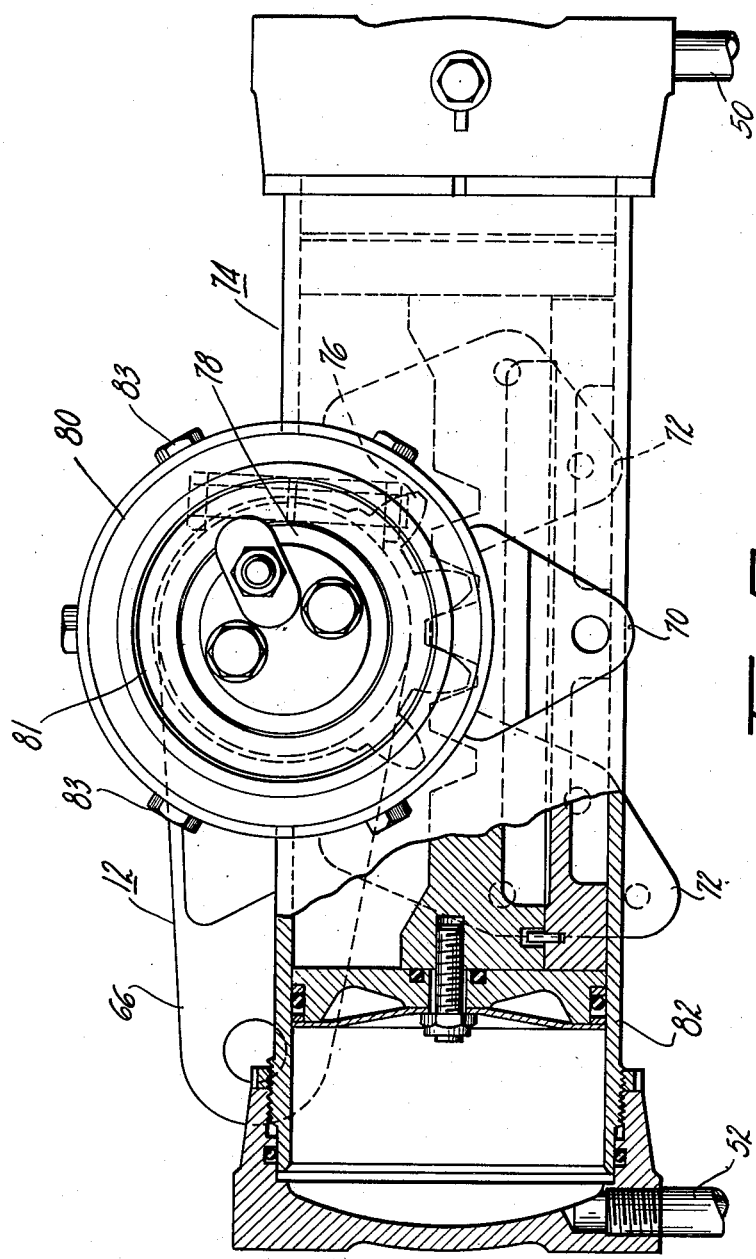
Figure 2 is a longitudinal sectional view of the actuator of the invention with parts in elevation.
Figure 3:
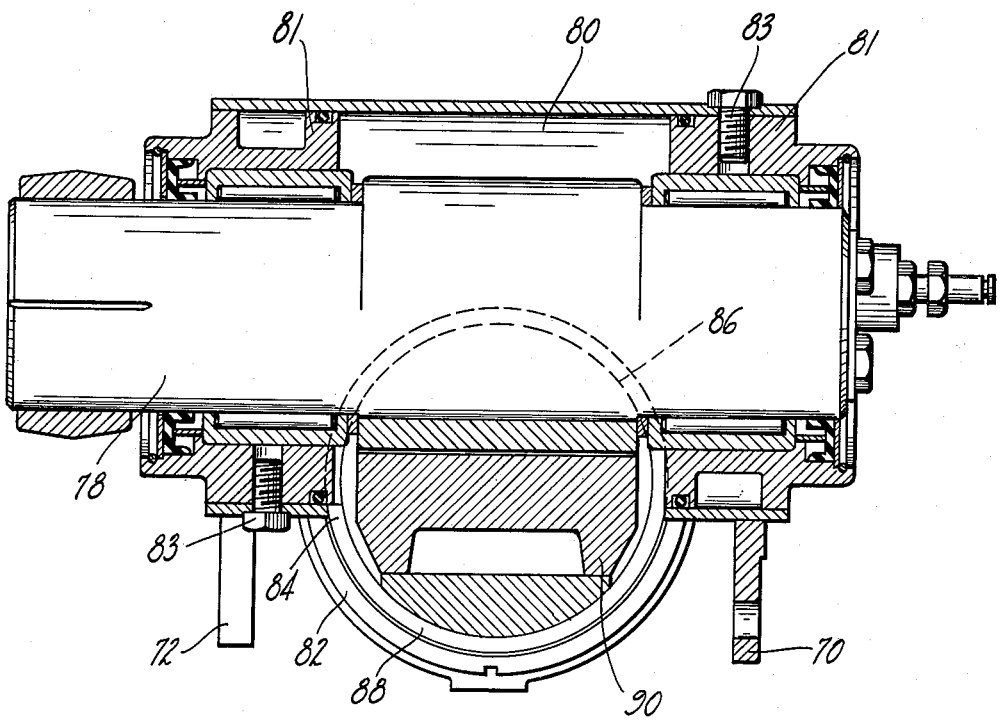
Figure 3 is a transverse sectional view of the actuator of Figure 2.
Figure 4:
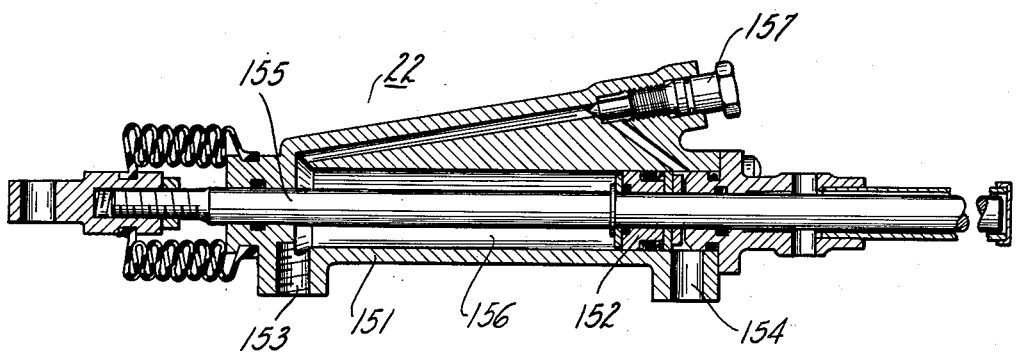
Figure 4 is a view in longitudinal section of the receiver shown in Figure 1.

As best shown in Figures 2 and 3, the actuator 12 is of unitary construction and comprises a hydraulic motor 74 drivably connected to a sector 76 splined or otherwise securely fastened to a shaft 78. The shaft is connected at one end to the receiver and at the other end to link 67, and is rotatably supported in roller bearings disposed in each end of cylinder 80. The bearings are pressed into supporting rings 81 which are held in position in the ends of the cylinder by cap screws 83 which threadedly engage the rings.

The hydraulic motor includes a cylinder 82 having its axis at right angles to the axis of cylinder 80. The walls of the cylinders 80 and 82 have openings 84 and 86 respectively, therein, which are in registry when the cylinders are welded in assembled relationship. The sector 76 projects through the openings 84 into the cylinder 82 where the sector engages the teeth of a rack 88 carried by a piston 90. The admission of fluid under pressure to one end of the motor cylinder 82 and simultaneously exhausting fluid from the other end of the cylinder moves piston 90 and in so doing imparts rotative motion to shaft 78 through the sector 76. Rotation of shaft 78 in turn rotates the collar 60 through the link 67, whereby the inner tube 18 is turned around its axis to change the direction of wheel 14.

Figure 5:
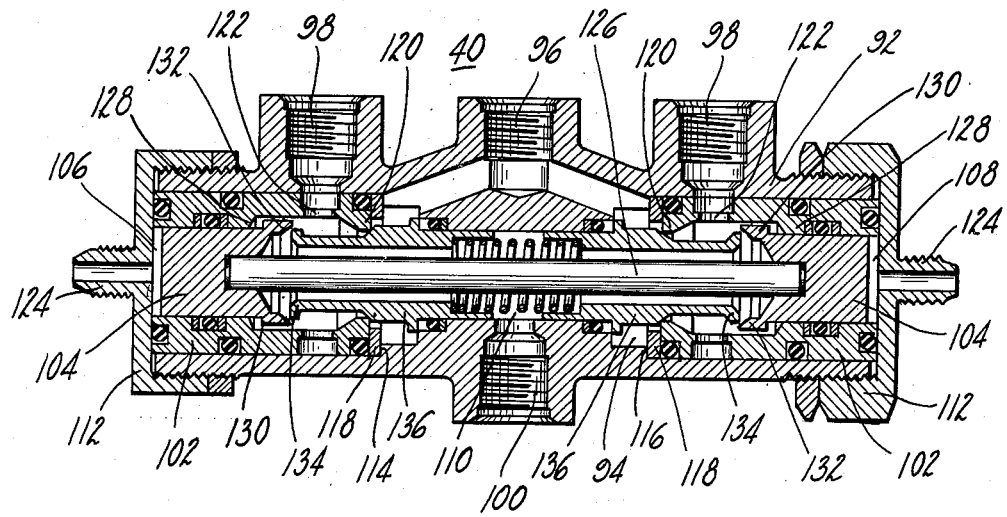
Figure 5 is a longitudinal sectional view of the hydraulically actuated valve of Figure 1.

The hydraulically actuated valve of Figure 5 comprises a body 92 with a bore 94 therein. An inlet port 96, cylinder or working ports 98, and return port 100 are formed in the body member and open into the bore at axially spaced positions therein. Sleeves 102 are located in opposite ends of bore 94 to receive plungers 104 coaxially arranged in opposing relationship so as to divide the bore into end chambers 106 and 108 and a central chamber 110. The ends of the bore are closed by caps 112 interiorly threaded to engage the body member. The sleeves are securely held in position in the bore between the cap 112 and shoulders 114 and 116. Spacers 118 are interposed between one end of the sleeves and the shoulders 114 and 116. The sleeves are provided with valve seats 120 arranged in the bore between the inlet port and the cylinder ports. The sleeves are bored radially at 122 so as to register with the cylinder ports to thereby communicate these ports with the bore. The caps 112 are provided with male connections 124 constituted to be connected to a pressure source, whereby the end chambers 106 and 108 are subjected to differential pressure which acts on the remote ends of plungers 104. A rod 126 extends through the bore and is carried at its ends by the adjacent or inner ends of the plungers 104. The length of rod 126 is such that when the pressures in the end chambers 106 and 108 are equal the valve heads 134 will be off valve seats 132, as shown in Figure 5. The arrangement of the rod and plungers is such that when a differential in pressure occurs in the ends of the bore the plungers and rod tend to move as a unit, that is, movement of any one of the plungers inwardly tends to move the other plunger outwardly. The plungers are limited on their axial outward travel by shoulders 128 formed on the sleeves to engage enlarged ends 130 of the plungers.

To control flow between the cylinder ports 98 and the return port 100, which opens into the central chamber, the enlarged heads 130 on the adjacent or inner ends of the plungers are equipped with valve seats 132 which cooperate with valve heads 134 formed on two hollow valve members 136 slidably interposed between the adjacent ends of the plungers in coaxial relationship. The valve members are normally urged onto the valve seats 120 located in the bore between the inlet and cylinder ports to thereby cut off communication between these ports. A spring 138 has its ends in engagement with the adjacent ends of the valve members to thereby urge the same onto the valve seats 120.

With an increase in pressure in chamber 106 and a concurrent decrease in pressure in chamber 108, the plunger on the left will move to the right where its valve seat will be engaged by the valve head of the hollow valve member on the left to cut off communication between the cylinder port on the left and the return port 100. Continued movement of the plunger unseats the left hollow valve member from valve seat 120 to establish communication between the inlet port and the left cylinder port. Movement of the plunger on the left in the aforementioned direction moves the plunger on the right away from its valve seat to thereby allow for an increase in flow between the cylinder port on the right and the return port. The flow between the cylinder and return ports being through the hollow valve member.

The transmitter 38, receiver 22, temperature compensating mechanism 39 and interconnecting conduits provide a closed hydraulic system for operating the hydraulic valve 40. The end chambers 106 and 108 of the valve are connected to conduits 28 and 32, and 26 and 30 respectively. The transmitter unit comprises a cylinder 140 having a piston 141 therein, dividing the cylinder into two chambers, one at each end thereof. The piston 141 has a rack 142, integral therewith. A shaft 143 is rotatably carried by the cylinder transversely thereof and provided with gears 144 and 145 secured to opposite ends of the shaft. A steering device or wheel 146 is splined or otherwise secured to one end of a shaft 147 having a pinion gear 148 suitably secured thereto at the other end for driving engagement with gear 145 to thereby impart reciprocal motion to piston 141 through rotative motion of the wheel. A conduit 149 connects the ends of the cylinder 140. A bleed or centering valve 150 is located in the conduit 149 for manual operation to thereby control communication between the ends of cylinder 140 to permit centering the piston 141 therein.

The receiver unit includes a cylinder 151 having a piston 152 reciprocally positioned therein and dividing the cylinder into a pair of opposed chambers. The cylinder body is formed with openings 153 and 154 in its ends for connecting the receiver with the transmitter through conduits 26 and 29 which in turn are in hydraulic circuit with conduits 30 and 32 respectively. A piston rod 155 is carried by the piston and extends through the ends of the cylinder 151 to thereby provide equal effective areas on the opposite sides of the piston. As best shown in Figure 1, the piston rod is operatively connected to the shaft 78 of the actuator and a passage 156 connects the ends of the cylinder 151. A manually operated valve 157 controls communication between the ends of the cylinder to permit centering the piston 151 as hereinbefore pointed out in regard to piston 141 of the transmitter.

With reference to Figure 1, it is obvious that the areas of the ends of piston 141 of the transmitter are greater than the corresponding areas of the ends of plungers 104 of the hydraulically actuated valve 40. It therefore requires a greater pressure in lines 34 and 36 to move the plungers than to move the piston. Hence any buildup in pressure in these lines due to shock loads on the wheel 14 will tend to move the piston in a direction to follow up the receiver piston 152, thus relieving the pressure in the lines. This response by the transmitter to a buildup in pressures in lines 34 and 36 as aforementioned precludes actuation of the valve mechanism 40 during normal nonsteering conditions.

To compensate for pressure changes in the closed hydraulic system due to variation in temperature of the fluid in the system the compensating mechanism 39 is provided. The mechanism includes a valve member 158 seated in a passage 159 which communicates conduits 30 and 36 with a reservoir 160, the interior of which is divided, by a flexible diaphragm 161, into an upper chamber 162 into which air is pumped under pressure, and a lower chamber 163 in communication with passage 159, whereby any change in volume of fluid in the system is accounted for in the reservoir 160. The valve member 158 has a stem 164 integral with a head 165 which is urged onto a valve seat 166 located in the passage 159 by a spring 167 to normally cut off communication between the chamber 163 and the lines 30 and 36. The stem of the valve member has one end subjected to the fluid under pressure in lines 32 and 34. A seal 168 encircles the valve stem to prevent leakage between the lines 34 and 36 axially along the valve stem. It will be noted that the effective annular area of the valve head formed between the valve seat and valve stem and on which the pressure in lines 30 and 36 acts when the valve member is seated, is equal to the effective area of the valve stem 164 on which the pressure in lines 32 and 34 act. In the present illustration the spring 167 is selected to exert a force on the valve member equal to substantially one-half the total operating force required for the system. Actually, however, the total force holding the valve member 158 on its seat is the summation of the force of the spring force 167 plus the pressure of the fluid in chamber 163 acting on the enlarged head of the valve stem. A check valve 169 is located in a passage 170 which connects the chamber 163 to lines 30 and 36 to thereby permit the flow of fluid from the chamber to the lines but prevent flow in the opposite direction. The conduit 48 intersects the passage 170 and is in communication with the fluid source used for operating the actuator 12. A check valve 172 is located in the conduit 48 to permit the flow of fluid into conduits 30 and 36 but prevent flow in the opposite direction. A spring 173 is interposed between the check valves 170 and 172 to urge them onto their seats. Manually controlled valves 175 and 176 are located in conduits 46 and 48 and normally disconnect the closed hydraulic system from the accumulator 54 and reservoir 44.

In the steering apparatus herein exemplified a closed hydraulic system controls a hydraulically actuated valve which is constituted to in turn control fluid under pressure from a second and open hydraulic system, whereby power steering is accomplished.

Operation of the steering apparatus is as follows:

With the parts of the steering apparatus in the positions indicated in the various figures, the pressures in the lines 30 and 36, and 32 and 34 of the closed hydraulic system are substantially balanced across the ends of the pistons 141 and 152, and consequently the pressures in the end chambers 106 and 108 are equal. Under these conditions the hydraulically actuated valve 40 is closed to thereby cut off fluid under pressure to the actuator from the pump or accumulator. The parts of the valve are now positioned to communicate the ends of the actuator hydraulic motor with the reservoir. Communication between the reservoir and actuator is through conduits 50, 52, cylinder ports 98, the hollow valve members 136, return port 100 and return conduit 46.

To accomplish steering, the wheel 146 is rotated in the desired direction. If for example, the steering wheel 146 is rotated in a manner to move piston 141 to the left the pressure in conduits 28, 32, 34, the left end of the hydraulic valve 40, and in the left end of the receiver 22, as viewed in Figure 1, will be increased and at the same time the pressure in conduits 26, 30, 36, the right end of the hydraulic valve, and in the right end of the receiver will be reduced, whereby a differential pressure is created in chambers 106 and 108. Since the increase in pressure is in chamber 106 the plungers 104 will be moved to right so that the valve head 134 engages the valve seat 132 to cut off communication between the left cylinder port 98 and the return port 100. Continued movement of the plungers to the right unseats the left hollow valve member from seat 120 to thereby establish communication between the inlet port and left cylinder port. The plunger on the right has also moved to the right so that its seat 132 has moved farther away from valve head 134 to permit uninterrupted flow between the cylinder port on the right and the return port.

With the valve ports in this position, fluid under pressure from the pump will act in the end of cylinder 82 toward the reader, moving the piston away from the reader and producing clockwise rotation of the sector 76 and shaft 78. With the crank arm 66 connected to one end of shaft 78 and the piston rod 155 of the receiver operatively connected to the other end thereof the tube 18 will be rotated about its axis to steer wheel 14 and the receiver piston will be moved to the right, as viewed in Figure 1, to thereby reduce the pressure in lines 28, 32, 34 and in chamber 106, at which time valve members 136 tend to return to their normal position shown in Figure 5.

When the transmitter is operated fluid in one end of the receiver is put under pressure which tends to move piston 152 but since it is operatively connected to the sector shaft 78 the receiver piston is held from movement. However, this same pressure which acts in the receiver also acts in the hydraulic valve to move the plungers and consequently the valve members to thereby establish communication between the actuator motor and the pump or accumulator to cause rotation of the sector and shaft. Rotation of the sector shaft 78 moves the receiver piston in the direction of its intended movement as determined by the end of the receiver cylinder in which pressure acts when the transmitter is operated. Any movement of the sector shaft relieves the pressure in the receiver cylinder and also in the ends of the hydraulic valve. This arrangement provides a follow up control which tends to equalize the pressure differential acting in chambers 106 and 108 and on the remote ends of the plungers.

Although this invention has been described in connection with certain specific embodiments, the principles are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A power steering apparatus for an aircraft equipped with a steered wheel, said apparatus comprising a hydraulic actuator connectible to the steered wheel, a fluid pressure source, a reservoir for fluid, conduits interconnecting the actuator with said source and reservoir, a closed hydraulic system including a steering device which performs the function of a transmitter for putting fluid in said closed system under pressure, a receiver in the closed system, a valve mechanism located in said conduits and having hydraulic connections to said closed system, and a mechanical connection between the actuator and receiver, said steering device constructed and arranged to respond to lower differential pressures than the valve mechanism when said pressures are developed in said closed system due to shock loads applied to the steered wheel, said valve mechanism having a neutral position in which communication is cut off between said source and said actuator and established between the latter and said reservoir to thereby permit unimpeded castering of said steered wheel at times of non-steering, said valve mechanism being movable from said neutral position in response to a pressure differential in the closed system created by movement of said steering device to thereby establish communication between said source and said actuator, said receiver being unresponsive to the pressure differential created in said closed system but responsive to movement of said actuator to thereby equalize the pressure differential in said closed hydraulic system whereupon the valve mechanism is returned to its neutral position.

2. A power steering apparatus for aircraft equipped with a steered member, said apparatus comprising a hydraulic actuator connectible to the steered member, a closed hydraulic system including a steering device for putting fluid in said closed system under pressure, a receiver in said closed system, a connection between said receiver and actuator, and a valve mechanism responsive to a differential in pressure in said closed system for controlling fluid under pressure to said actuator, said valve mechanism being interconnected with said closed hydraulic system, conduits connecting said valve mechanism to the actuator, said valve mechanism being provided with two openings, one of which is connectible to a fluid pressure source and the other of which is connectible to a reservoir, said valve mechanism having a neutral position in which communication is cut off between said actuator and the opening connectible to said source and established between said actuator and the opening connectible to said reservoir, said steering device constructed and arranged to respond to lower differential pressures than the valve mechanism when said pressures are developed in said closed system due to shock loads applied to the steered wheel to thereby provide an open fluid circuit to the actuator so that the steered member is free to move during non-steering.

3. A power steering apparatus for an aircraft wheel, said apparatus comprising a hydraulic actuator connected to the wheel, a steering device, a fluid pressure source, a reservoir for fluid, conduits interconnecting the actuator with said source and reservoir, a closed hydraulic system including said steering device which performs the function of a transmitter for putting fluid in said closed system under pressure, a receiver in the closed system, a valve mechanism located in said conduits and having hydraulic connections to said closed system, and a mechanical connection between the actuator and receiver, said steering device and valve mechanism each being provided with areas on which act differential pressures developed in said closed system due to shock loads applied to said wheel, the areas of the steering device being greater than corresponding areas of said valve mechanism, said valve mechanism having a neutral position in which communication is cut off between the said source and said actuator and established between the latter and said reservoir to thereby permit unimpeded castering of said wheel at times of nonsteering, said valve mechanism being movable from said neutral position in response to a pressure differential in the closed system created by movement of said steering device to thereby establish communication between said source and said actuator, said receiver being unresponsive to the pressure differential created in said closed system but responsive to movement of said actuator to thereby equalize the pressure differential in said closed hydraulic system whereupon the valve mechanism is returned to its neutral position.

HAROLD B. SCHULTZ.

REFERENCES CITED

The following references are of record in the file of this patent:

UNITED STATES PATENTS

| Number | Name | Date |
| --- | --- | --- |
| 897,907 | Lang | Sept. 8, 1908 |
| 2,030,986 | Havill | Feb. 18, 1936 |
| 2,236,467 | Clench | Mar. 25, 1941 |
| 2,252,660 | Kulikoff | Aug. 12, 1941 |
| 2,260,979 | Morin | Oct. 28, 1941 |
| 2,397,270 | Kelly | Mar. 26, 1946 |
| 2,458,736 | Rockwell | Jan. 11, 1949 |

FOREIGN PATENTS

| Number | Country | Date |
| --- | --- | --- |
| 702,983 | Germany | Feb. 25, 1941 |